United States Patent
Goodwin et al.

(10) Patent No.: US 8,392,049 B2
(45) Date of Patent: Mar. 5, 2013

(54) MULTI-DIRECTION VEHICLE CONTROL SENSING

(75) Inventors: Christopher J. Goodwin, Greenville, NC (US); Brian R. Crowell, Greenville, NC (US); Timothy L. Rose, Fountain Inn, SC (US); James W. Davis, Amelia Island, FL (US); Gerald A Johnson, Greenville, NC (US); Kevin J. McGoldrick, Greenville, NC (US); Michael Curry, Greenville, NC (US)

(73) Assignee: NMHG Oregon, LLC, Fairview, OR (US)

( * ) Notice: Subject to any disclaimer, the term of this patent is extended or adjusted under 35 U.S.C. 154(b) by 710 days.

(21) Appl. No.: 12/464,570

(22) Filed: May 12, 2009

(65) Prior Publication Data
US 2009/0222167 A1   Sep. 3, 2009

Related U.S. Application Data

(63) Continuation-in-part of application No. 11/779,177, filed on Jul. 17, 2007, now Pat. No. 7,775,317.

(60) Provisional application No. 60/831,724, filed on Jul. 17, 2006, provisional application No. 61/052,605, filed on May 12, 2008.

(51) Int. Cl.
*G01M 17/00* (2006.01)

(52) U.S. Cl. ......... 701/29.1; 180/321; 180/333; 74/469; 74/471 R; 74/479.01

(58) Field of Classification Search .............. 180/89.12, 180/321, 332, 333; 701/29.1; 74/469, 471 R, 74/479.01, 484 R
See application file for complete search history.

(56) References Cited

U.S. PATENT DOCUMENTS

| 1,672,212 | A | 6/1928 | Hale |
| 3,195,913 | A | 7/1965 | Hallsworth |
| 3,465,841 | A | 9/1969 | Harshbarger et al. |
| 3,738,441 | A | 6/1973 | Kemner |
| 3,791,474 | A | 2/1974 | Stammen et al. |
| 3,937,294 | A | 2/1976 | Haddock |
| 4,702,520 | A | 10/1987 | Whisler et al. |
| 5,036,942 | A | 8/1991 | Loewen |
| 5,052,512 | A | 10/1991 | Pakosh et al. |
| 5,265,021 | A | 11/1993 | Avitan |

(Continued)

FOREIGN PATENT DOCUMENTS

| DE | 10212623 | 10/2003 |
| DE | 10347925 | 5/2005 |

(Continued)

OTHER PUBLICATIONS

S01361156900; Manual Supplement; Model: H8.00-16.00XM-6; NAACO Materials Handling Group PTY Ltd; pp. 1-10; Jan. 2006.

(Continued)

*Primary Examiner* — Toan To
(74) *Attorney, Agent, or Firm* — Stolowitz Ford Cowger LLP

(57) ABSTRACT

A vehicle includes a first control configured to operate the vehicle from a first operator position facing a front of the vehicle and a second control configured to operate the vehicle from a second operator position facing a rear of the vehicle. The vehicle further includes a processor configured to monitor for an operator presence in the first operator position or the second operator position and receive a vehicle operating request, wherein the operator presence is monitored independent of receiving the vehicle operating request. The processor is further configured to enable either the first control or the second control and select a vehicle operating parameter associated with the vehicle operating request, wherein the vehicle operating parameter varies according to which control is enabled.

22 Claims, 10 Drawing Sheets

U.S. PATENT DOCUMENTS

| | | |
|---|---|---|
| 5,887,669 A | 3/1999 | Ostler et al. |
| 5,890,562 A | 4/1999 | Bartels et al. |
| 6,182,778 B1 | 2/2001 | Henshaw et al. |
| 6,390,764 B1 | 5/2002 | Merlo et al. |
| 6,564,906 B1 | 5/2003 | Haack et al. |
| 6,679,349 B1 | 1/2004 | Pollish, Jr. |
| 6,694,240 B1 | 2/2004 | Swick et al. |
| 6,776,249 B2 | 8/2004 | Fortin |
| 6,793,247 B2 * | 9/2004 | Swetish .................. 280/775 |
| 6,871,721 B2 | 3/2005 | Smiley et al. |
| 6,883,625 B2 | 4/2005 | Trego et al. |
| 6,955,239 B2 | 10/2005 | Ueda et al. |
| 6,962,231 B2 | 11/2005 | Carlsson et al. |
| 6,971,194 B2 | 12/2005 | McClelland et al. |
| 6,971,470 B2 | 12/2005 | McGoldrick |
| 7,025,157 B2 | 4/2006 | Lindsay et al. |
| 7,051,832 B2 | 5/2006 | Lewis et al. |
| 7,121,608 B2 | 10/2006 | Billger et al. |
| 7,142,963 B2 | 11/2006 | Borroni-Bird et al. |
| 7,159,687 B2 | 1/2007 | Dunn et al. |
| 7,353,099 B2 | 4/2008 | Lindsay et al. |
| 7,428,943 B2 * | 9/2008 | Smiley et al. ............ 180/321 |
| 7,441,625 B2 | 10/2008 | Ackermann |
| 7,484,587 B2 | 2/2009 | Portscheller et al. |
| 7,496,441 B2 | 2/2009 | Brandt et al. |
| 7,537,074 B2 * | 5/2009 | Ishii et al. .............. 180/89.12 |
| 7,726,745 B2 * | 6/2010 | Bruns et al. ............ 297/411.36 |
| 7,772,969 B2 | 8/2010 | Prohaska |
| 7,775,317 B1 | 8/2010 | Goodwin et al. |
| 7,784,581 B1 * | 8/2010 | Klas et al. ............... 180/329 |
| 7,849,951 B2 * | 12/2010 | Borchers et al. ............ 180/305 |
| 7,854,291 B2 * | 12/2010 | Akahane et al. ............ 180/333 |
| 7,870,919 B2 * | 1/2011 | Waltz et al. ................ 180/89.1 |
| 2003/0127272 A1 | 7/2003 | Baker et al. |
| 2004/0144590 A1 | 7/2004 | Fluent et al. |
| 2005/0023070 A1 | 2/2005 | Smiley et al. |
| 2005/0045409 A1 | 3/2005 | Fenelli et al. |
| 2006/0137931 A1 * | 6/2006 | Berg et al. ................ 180/333 |
| 2006/0207822 A1 | 9/2006 | Taylor |
| 2007/0074924 A1 * | 4/2007 | Schonauer et al. ......... 180/333 |
| 2007/0119647 A1 | 5/2007 | Kusunoki |
| 2007/0295551 A1 | 12/2007 | Proud et al. |
| 2008/0047245 A1 | 2/2008 | MacGregor et al. |
| 2009/0012677 A1 | 1/2009 | Passeri et al. |
| 2009/0223734 A1 | 9/2009 | Frett et al. |

FOREIGN PATENT DOCUMENTS

| | | |
|---|---|---|
| GB | 2008065 | 5/1979 |
| WO | 2006113510 | 10/2006 |

OTHER PUBLICATIONS

International Search Report and Written Opinion, mailed Oct. 16, 2008; PCT Application No. PCT/US08/069253, filed Oct. 16, 2008; 14 pages.

International Preliminary Examination Report, mailed Jan. 12, 2010; PCT Application No. PCT/US08/069253, filed Oct. 16, 2008; 9 pages.

European Patent Office; "Communication Pursuant to Article 94(3) EPC"; European Patent Application No. 08796101.7; dated Feb. 22, 2011; 4 pages.

Stolowitz Ford Cowger LLP; "Listing of Related Cases"; May 23, 2011; 1 page.

\* cited by examiner

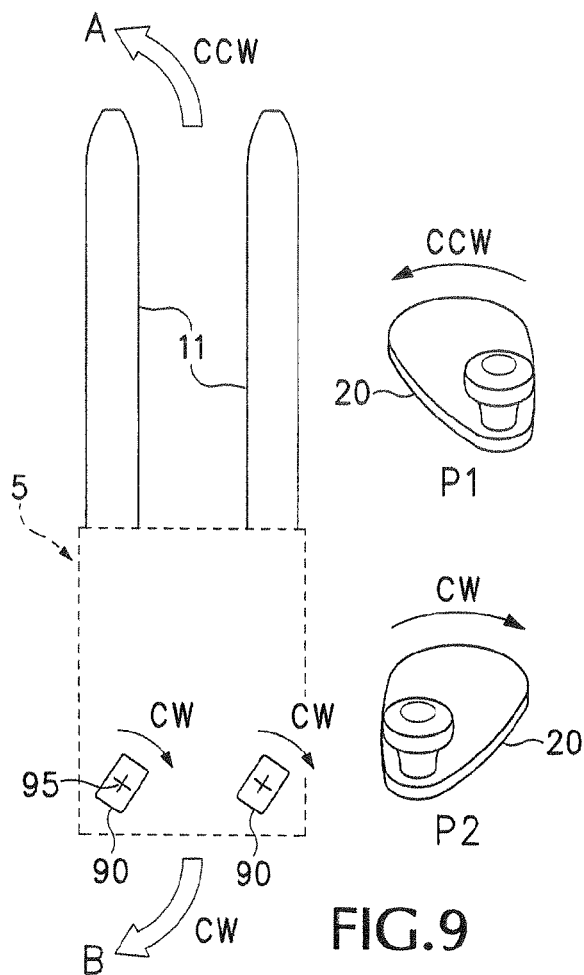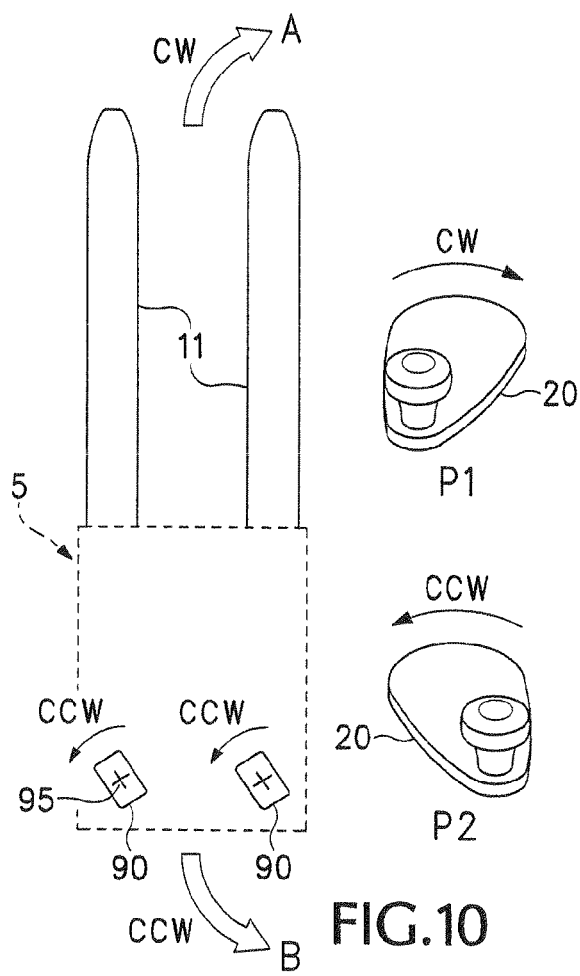

MULTI-DIRECTION VEHICLE CONTROL SENSING

This application is a Continuation-In-Part of U.S. application Ser. No. 11/779,177 filed on Jul. 17, 2007 and claims priority to U.S. provisional application No. 60/831,724 filed on Jul. 17, 2006 and U.S. provisional application No. 61/052,605 filed on May 12, 2008, the contents of which are incorporated by reference in their entirety.

BACKGROUND

Industrialized vehicles, such as fork lift trucks operated by a standing operator, often include a multi-function control device that enables operation of a vehicle traction control, auxiliary functions, horn and other vehicle operations. Many fork lift trucks are operated by an operator facing the front of the vehicle or turned 180 degrees to face the rear of the vehicle. In such vehicles, the multi-function control device is typically provided at the front of the vehicle so that an operator may grasp the control device while facing in a forward direction. Ease of operation in a forward stance is provided with a single grip handle assembly.

While traveling in a reverse direction, the operator may be inclined to be repositioned in a rearward operator stance opposite the forward direction. However, the control devices are optimized for operation in only one of the operator orientations, not both, and more specifically are ergonomically designed to be operated exclusively by a right or left hand. Furthermore, it is difficult to locate a control device that can be comfortably operated from both the forward and rearward operator stances.

A steering control device may also be provided on the vehicle. The same steering control device is used to steer the vehicle regardless of the orientation of the operator. The steering control device does not provide the same intuitive steering for an operator oriented in a rearward stance with the vehicle traveling in reverse, as compared to operation of the vehicle from the forward stance in the forward direction of travel.

Vehicle operating systems including control devices at both the front and rear of the vehicle provide an ease of operation, however the separate control assemblies add possibility of conflicting control device commands.

The present invention addresses these and other problems.

SUMMARY OF THE INVENTION

A vehicle is disclosed, as comprising a first control configured to operate the vehicle from a first operator position facing a front of the vehicle and a second control configured to operate the vehicle from a second operator position facing a rear of the vehicle. The vehicle further comprises a processor configured to monitor for an operator presence in the first operator position or the second operator position and receive a vehicle operating request, wherein the operator presence is monitored independent of receiving the vehicle operating request. The processor is further configured to enable either the first control or the second control and select a vehicle operating parameter associated with the vehicle operating request, wherein the vehicle operating parameter varies according to which control is enabled.

A method is disclosed, as comprising monitoring an operator presence at one or more control handles of a vehicle, wherein the vehicle comprises two or more control handles, and wherein at least one control handle is configured to detect the operator presence. The method further comprises receiving a vehicle operating command from a control selected from the group consisting of the two or more control handles and enabling the selected control to command the vehicle.

A computer-readable medium is disclosed having stored thereon, computer-executable instructions that, if executed by a system, cause the system to perform a method comprising detecting an operator presence at a control selected from a group consisting of a first control and a second control and receiving a vehicle command from the selected control. The method further comprises comparing the vehicle command with a state of vehicle operation to determine if a vehicle is in a ready state and selecting a vehicle operating parameter associated with the vehicle command. The selected control is enabled and the vehicle command is implemented when the vehicle is in the ready state, wherein the vehicle operating parameter is modified according to which of the first control or the second control is enabled.

BRIEF DESCRIPTION OF THE DRAWINGS

FIG. 9 illustrates an example of steering a vehicle in a forward and reverse direction.

FIG. 10 illustrates a further example of steering a vehicle in a forward and reverse direction.

DETAILED DESCRIPTION

Figure 1:
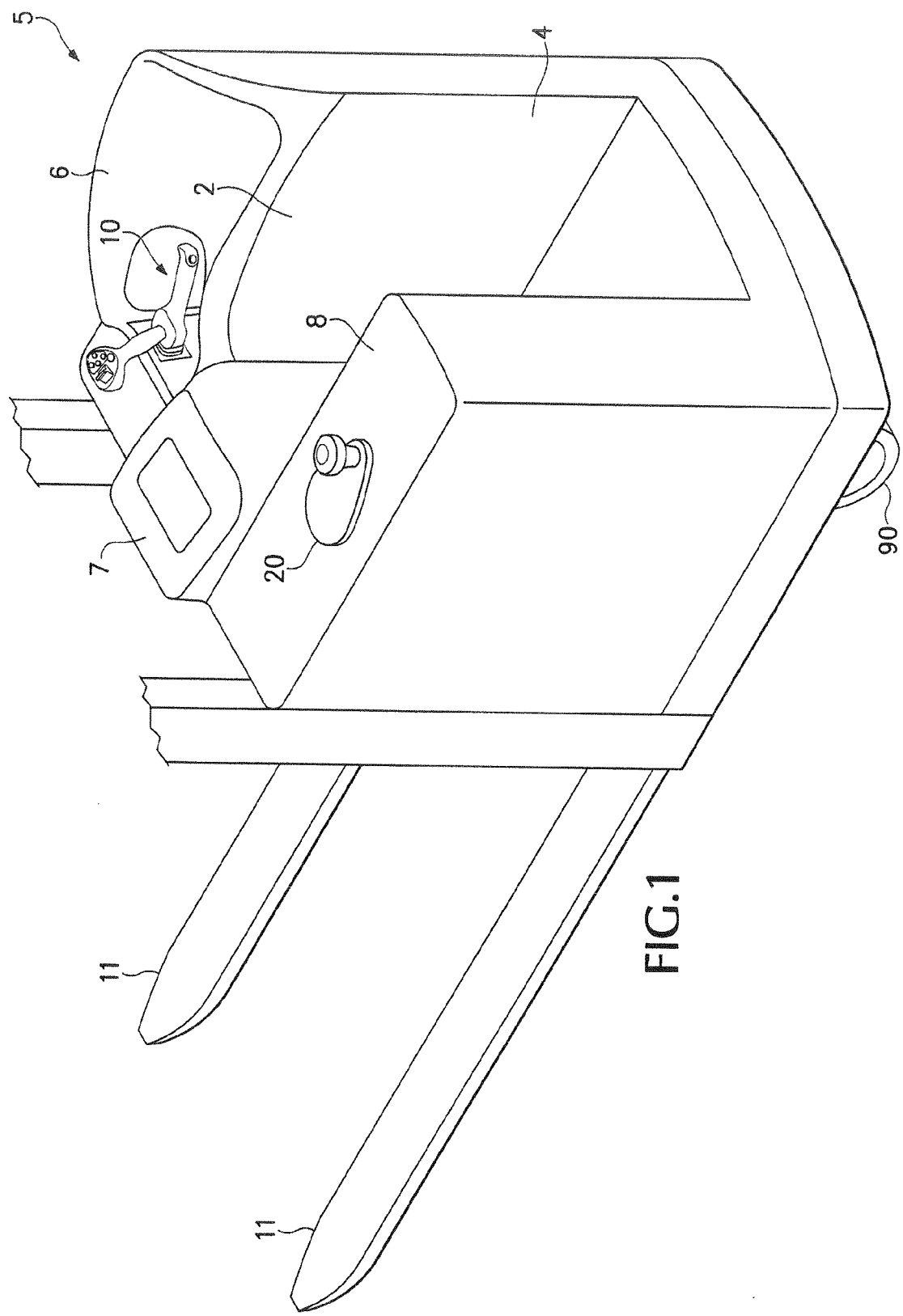
FIG. 1 is a rear elevation view of an industrial vehicle configured for operation by a standing operator, illustrating a dual grip operator control.

FIG. 1 is a rear elevation view of an industrial vehicle 5 configured for operation by a standing operator, shown as an example electric fork lift truck, illustrating a dual grip operator control 10. For industrial vehicles with forward and rear facing operator positions, effective traction and horn controls are provided for each operator position. Vehicle controls are configured to provide an operator control of the vehicle 5 while facing the front 7 of an operator compartment 2, oriented towards the vehicle forks 11. The vehicle controls are also configured to provide the operator control of the vehicle 5 while facing the rear or ingress 4 of the vehicle 5, in a direction opposite the vehicle forks 11. The vehicle controls may include the dual grip operator control 10 located approximately at an end of the right side 6 of the operator compartment 2 towards the front portion 7. The vehicle controls may also include a steering apparatus 20, such as steering wheel, located at an approximate midpoint on a left side 8 of the operator compartment 2.

A multi-directional, multi-function dual grip operator control 10 provides control of traction and horn functions from a single control assembly located in the operator compartment 2. The dual grip operator control 10 may be configured to be operated from multiple operator positions, such as a forward or rearward operator stance. Two separate hand grips may be provided on the dual grip operator control 10 so that the vehicle can be operated from either a forward and rearward operator stance.

Figure 2:
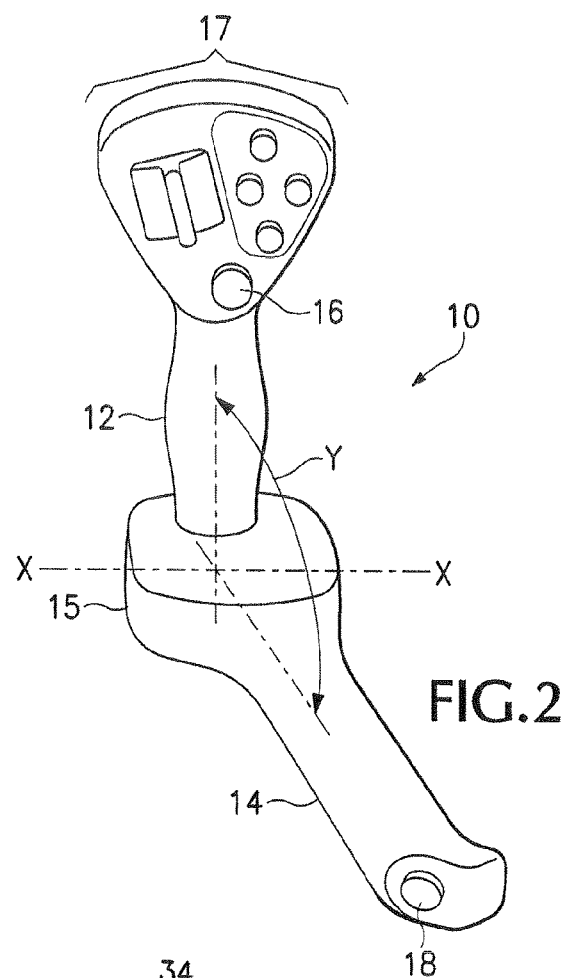
FIG. 2 is a close up perspective view illustrating the dual grip operator control of FIG. 1.

FIG. 2 is a close up perspective view illustrating the dual grip operator control 10 of FIG. 1. The dual grip operator control 10 may be positioned for ease of operation in forward and rearward operator positions, providing an operator with a comfortable hand grip position in any stance to reduce operator fatigue and improve operator productivity. By utilizing a common pivot mechanism and angle sensors, parts are reduced and the traction control system is simplified. Reducing parts and simplifying the control system improves reliability of the vehicle 5.

Two hand grip positions are provided on dual grip operator control 10. A primary hand grip 12 may be utilized by an operator when facing and operating the truck in a forward position facing the forks 11 of FIG. 1. The primary hand grip 12 may be a joy stick. The primary hand grip 12 provides the operator with multi-function controls 17 that may include traction, hoist, reach, tilt, side-shift or other vehicle functions when operating the vehicle 5. An alert function 16 may be provided on the primary hand grip 12, and may be configured as a horn button or switch. A secondary hand grip 14 may be utilized by the operator when facing and operating the vehicle 5 in a rearward position facing the back of the vehicle 5, in a direction opposite the forks 11. The secondary hand grip 14 may include traction control and a secondary alert button 18. A secondary alert button 18 may be configured as a horn button or switch, for example, and that may be operated by a thumb or finger of the operator.

The dual grip operator control 10 illustrated in FIG. 2 is shown as being a single control assembly, including a first control arm, or primary hand grip 12, oriented in a substantially upright position. The primary hand grip 12 may be configured to operate or control a speed of the vehicle 5 from a first operator position, such as when the operator faces the front 7 of the operator compartment 2 shown in FIG. 1.

The dual grip operator control 10 is also shown as including a second control arm, or secondary hand grip 14, which may extend or stem from the primary hand grip 12 in a reclined position. The secondary hand grip 14 may be configured to operate or control the speed of the vehicle 5 from a second operator position oriented opposite the first operator position. The second operator position may be associated with the operator facing the ingress 4 of the operator compartment 2 shown in FIG. 1. The first operator position may be associated with a first direction of vehicle travel, and the second operator position may be associated with a second direction of vehicle travel opposite the first direction.

The dual grip operator control may be provided as a control assembly, where the primary hand grip 12 and secondary hand grip 14 are rigidly connected to each other or assembled together. In one embodiment the dual drip operator control 10 is provided with the primary hand grip 12 and secondary hand grip 14 formed, molded or fabricated as an integral component.

A vehicle control assembly, including the dual grip operator control 10 and the steering apparatus 20 shown in FIG. 1, provides for additional flexibility of operator orientation and comfort. The steering apparatus 20 may be located on a side of a vehicle operator compartment opposite that of the dual grip operator control 10 including the primary and secondary hand grips 12, 14. The steering apparatus 20 may be positioned to be accessible to an operator operating the primary and secondary hand grips 12, 14.

The primary hand grip 12 and the steering apparatus 20 may be configured to be simultaneously operated in a first direction of vehicle travel, such as towards the vehicle forks 11. The secondary hand grip 14 and the steering apparatus 20 may be configured to be simultaneously operated in a second direction of vehicle travel opposite the first direction, or opposite the vehicle forks 11.

The primary and secondary hand grips 12, 14 of the dual grip operator control 10 may be a single axis lever type traction control mounted to a common pivot, illustrated as pivot axis X-X and sensor mechanism. The axis X-X may be located at a position external to the dual grip operator control 10, such as where the dual grip operator control 10 mounts to the front 7 or side 6 of the operator compartment 2 of FIG. 1.

The primary hand grip 12 may be mounted approximately vertically for stability and ease of operation when facing forward on the vehicle 5. The secondary hand grip 14 may be mounted approximately horizontally for accessibility when facing rearward on the vehicle. The secondary hand grip 14 may serve as a palm rest for operation of the primary hand grip 12.

As previously discussed, the primary hand grip 12 illustrated as a joystick in FIG. 2, may include multi-function controls 17 and be configured to control a direction of travel of the vehicle 5. The secondary hand grip 14 is shown connected to a base 15 of the primary hand grip 12, where the connection of the primary and second hand grips 12, 14 forms an angle Y whose apex is formed at the connection. The angle Y of attachment may determined by an angle formed between the upright position of the primary hand grip 12 and the reclined position of the secondary hand grip 14. In one embodiment, the angle Y forms an approximate right angle. In another embodiment, the angle Y forms an obtuse angle.

The secondary hand grip 14 may be configured to extend a reach of the primary hand grip 12 in a direction transverse to the orientation of the primary hand grip 12 to enable control of the direction of travel of the vehicle 5 from different operator orientations. The primary and secondary hand grips 12, 14 may be rigidly connected to each other. The angle Y of attachment between the primary and secondary hand grips 12, 14 may remain fixed while either of the primary and secondary hand grips 12, 14 is rotated about one or more axes of rotation, such as axis X-X.

Figure 3:
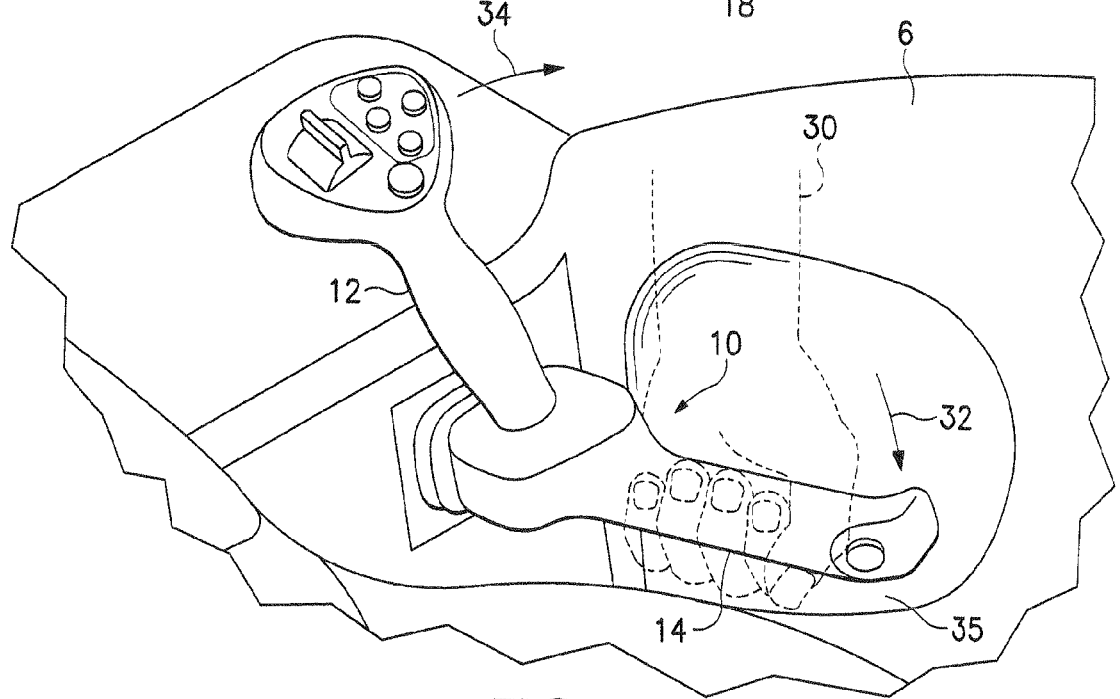
FIG. 3 is a partial view of an operator compartment illustrating an example application of the dual grip operator control of FIG. 1.

FIG. 3 is a partial view of right side 6 of the operator compartment 2 illustrating an example application of the dual grip operator control 10 of FIG. 1. The primary hand grip 12 may be configured to conform to an operator's right hand in a first operator orientation, for example with the operator facing the forks 11 of the vehicle 5. The left hand of the operator remains free to operate the steering apparatus 20 while the right hand operates the primary hand grip 12. In the partial view illustrated in FIG. 3, a left hand of an operator 30 is shown as an environmental element grasping the secondary hand grip 14. In one embodiment, the operator 30 is facing the ingress 4 of the vehicle 5 (see FIG. 1) while grasping the secondary hand grip 14. A right hand of the operator 30 remains free to operate the steering apparatus 20 while the left hand operates the secondary hand grip 14.

The secondary hand grip 14 may be configured to conform to the left hand of the operator 30 in a second operator orientation opposite the first operator orientation. The right side 6 of the operator compartment 6 may include a recess 35 that provides room to maneuver or otherwise accommodates the left hand of the operator 30 as the secondary hand grip 14 is being rotated downwards 32. The left hand of the operator 30, as well as the secondary hand grip 14, may descend into the recess 35 during the downward motion 32. The primary hand grip 12 may simultaneously rotate in a corresponding rotational direction 34 as the secondary hand grip 14 is rotated downwards 32.

A common sensor may be utilized to detect when either the primary or secondary hand grips 12, 14 is being rotated in one or more rotational directions, for example about the axis X-X of FIG. 2. In one embodiment, a rotation of either the primary or secondary hand grips 12, 14 results in the entire dual grip operator control 10 to rotate about a common axis. The dual grip operator control 10 may be rotated about axis X-X in a first rotational direction to request a forward direction of acceleration of the vehicle 5. The dual grip operator control 10 may be rotated about axis X-X in a second rotational direction opposite the first rotational direction, to request a reverse direction of acceleration of the vehicle 5. As such, either of the primary or secondary hand grips 12, 14 may be utilized to request a forward or reverse direction of travel.

Figure 4:
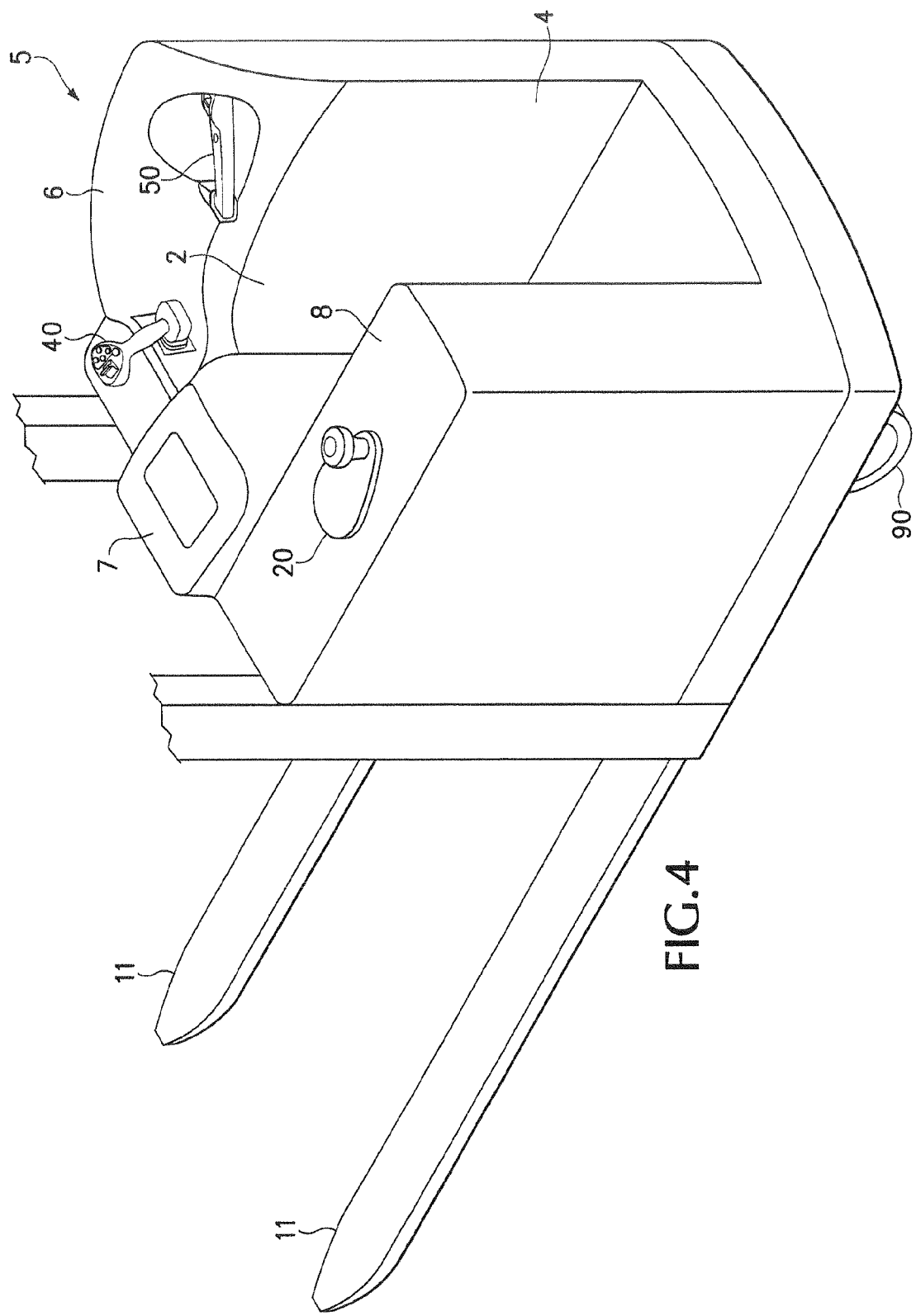
FIG. 4 is a rear elevation view of an industrial vehicle illustrating a primary control, a secondary control, and a steering apparatus.

FIG. 4 is a rear elevation view of an industrial vehicle 5 configured for use by a standing operator Illustrating a vehicle control system including a primary control 40, a secondary control 50, and the steering apparatus 20. The secondary control 50 may provide similar control of vehicle operation as the secondary hand grip 14 described with reference to FIGS. 2 and 3, but is spaced apart from the primary control 40. The secondary control 50 is illustrated in the embodiment shown in FIG. 4 as being located near the rear of the vehicle 5, as a side opposite that of the steering apparatus 20. The secondary control 50 may be shaped as a grab handle to assist the operator of the vehicle 5 during ingress and egress of the operator compartment 2 as well as providing additional operator stability during vehicle travel.

A first control handle, or primary control 40, is shown being located near a first side or front 7 of the operator compartment 2 opposite an operator ingress 4. The primary control 40 may be configured to be rotated about one or more axes of rotation and control a rate of travel of the vehicle 5. A second control handle, or secondary control 50, may be mounted on a second or right side 6 of the operator compartment 2 between the first side of the operator compartment 2 and the operator ingress 4. The secondary control 50 may be rigidly mounted to the right side 6 of the operator compartment and configured to control the rate of travel of the industrial vehicle without being rotated or pivoted about any axis.

With the operator facing the rear/aft of the vehicle 5, opposite the forks 11, the secondary control 50 may be held by the operator's left hand while the steering apparatus 20 may be operated by the operator's right hand to steer the vehicle 5.

With the operator facing the front/forks of the vehicle 5, the primary control 40 may be held by the operator's right hand while the steering apparatus 20 is controlled with the left hand. Either of the primary or secondary controls 40, 50 may be utilized to request a forward or reverse direction of travel of the vehicle 5.

Figure 5:
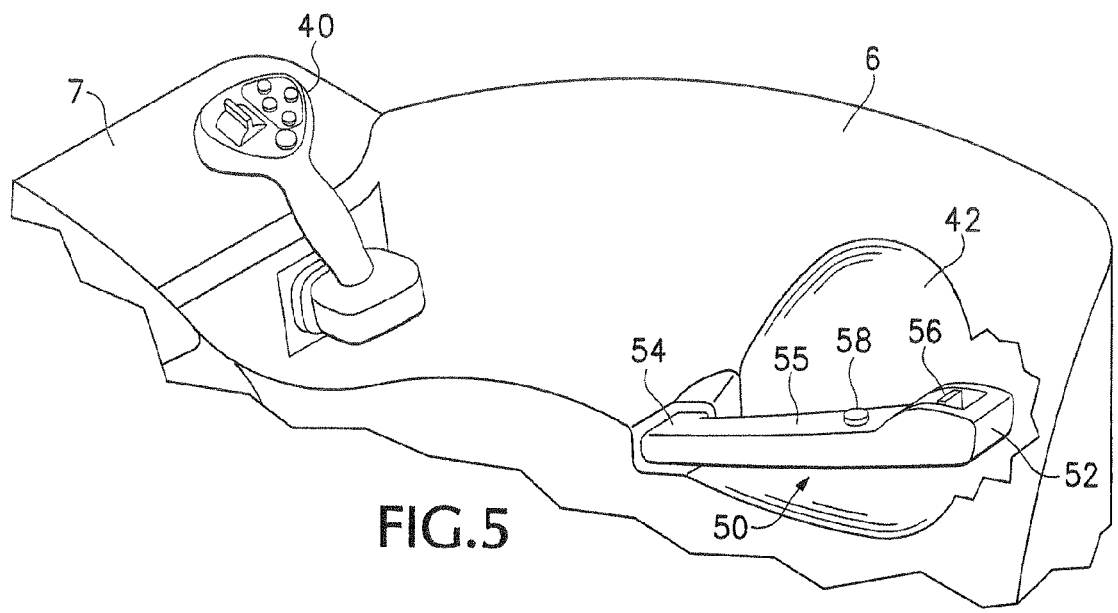
FIG. 5 is a close up perspective view of the primary and secondary controls illustrated in FIG. 4.

FIG. 5 is a close up perspective view of the primary and secondary controls 40, 50 illustrated in FIG. 4. The secondary control 50 may be located at an end of the right side 6 of the operator compartment 2 adjacent the operator ingress 4. The secondary control 50 includes a grab handle 55 that may be rigidly mounted by a first end 52 and a second end 54 to the right side 6 of the operator compartment. The right side 6 of the operator compartment may include a recess 42 located about the grab handle 55 to provide access space or otherwise accommodate a hand of the operator during operation or grasping of the secondary control 50. The grab handle 55 may provide the operator with additional stability or point of contact when entering or leaving the operator compartment 2 or during operation of the vehicle 5.

A directional control 56 and an alert function or horn button 58 are visible on a top surface of the grab handle 55. The directional control 56 may be located at or below the top surface of the grab handle 55 to avoid accidental actuation by the operator. The direction control 56 may control a direction or rate of travel of the vehicle. The primary control 40 may be configured to be operated by an operator oriented in a first direction of vehicle travel, and the secondary control 50 may be configured to be operated by an operator oriented in a second direction of vehicle travel opposite the first direction.

Figure 6:
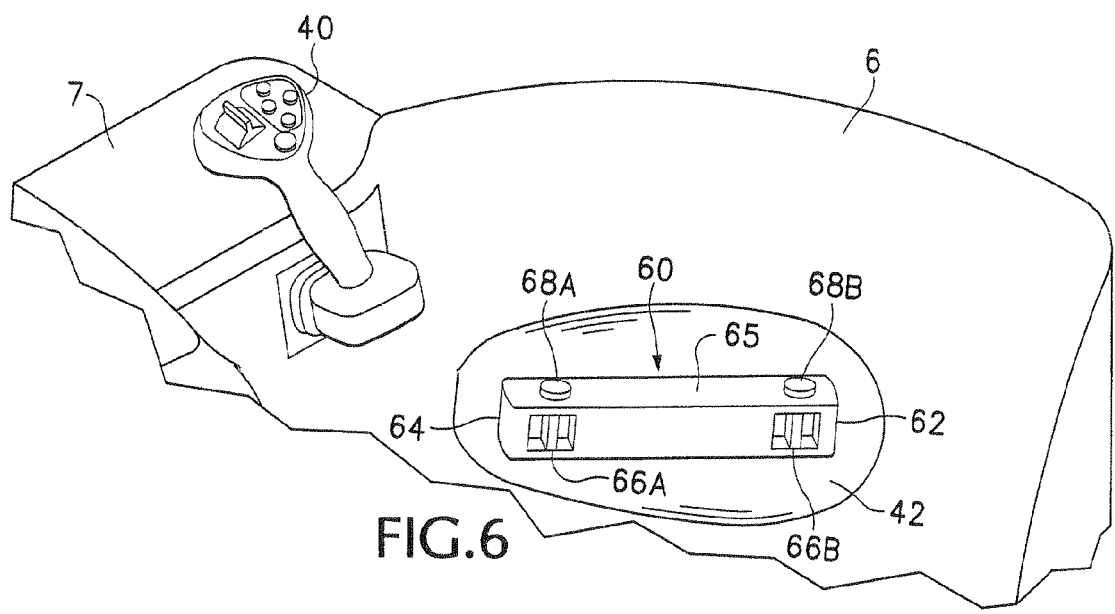
FIG. 6 illustrates an example embodiment of a primary and secondary control in an alternate arrangement.

FIG. 6 illustrates an example embodiment of the primary control 40 and a secondary control 60 in an alternate arrangement, where the secondary control 60 is shown located in the approximate midpoint of the operator compartment 2, intermediate the front 7 and the operator ingress 4. The secondary control 60 may be located at a side opposite that of a steering apparatus 20, at any position intermediate the front 7 and the operator ingress 4.

With the operator facing the rear/aft of the vehicle 5, opposite the forks 11, the secondary control 60 located at the midpoint may be held by the operator's left hand while the steering apparatus 20 is operated by the operator's right hand to steer the vehicle 5. Alternatively, with the operator facing the front/forks of the vehicle 5, the secondary control 60 may be held by the operator's right hand while the steering apparatus 20 is controlled with the left hand. The secondary control 60 is therefore accessible to the operator while facing or traveling in either the front or rear/aft directions. Either of the primary or secondary controls 40, 60 may be utilized to request a forward or reverse direction of travel of the vehicle 5.

The secondary control 60 includes a grab handle 65 that may be rigidly mounted by a first end 62 and a second end 64 to the right side 6 of the operator compartment. The right side 6 of the operator compartment may include a recess 42 located about the grab handle 65 to provide access space or otherwise accommodate a hand of the operator during operation or grasping of the secondary control 60. The grab handle 65 may provide the operator with additional stability or point of contact when entering or leaving the operator compartment 2 or during operation of the vehicle 5.

To accommodate travel and operator orientations in front and rear directions, the secondary control 60 may be provided with multiple direction controls 66A, 66B. Directional controls 66A, 66B are visible on a side surface of the grab handle 65, however in an alternate embodiment they are provided on the top surface of the grab handle 65. The directional controls 66A, 66B may be located at or below the side surface of the grab handle 65 to avoid accidental actuation by the operator. The direction controls 66A, 66B may control a direction or rate of travel of the vehicle 5. The first direction control 66A may be configured to be operated by an operator facing a first direction of vehicle travel towards the vehicle forks 11, for example by the right hand of the operator. The second direction control 66B may be configured to be operated by an operator facing in a second direction of vehicle travel opposite the first direction, for example by the left hand of the operator. Horn buttons 68A and 68B may be provided to be easily accessible by either the right or left hand, respectively.

Figure 7A:
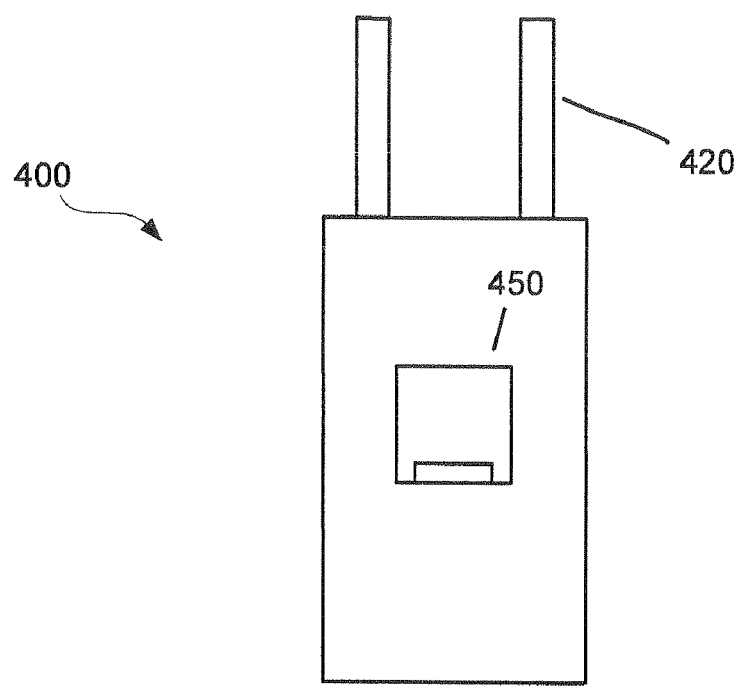
FIG. 7A illustrates an example operator position in a vehicle.

FIG. 7A illustrates an example operator position in a vehicle 400. The vehicle 400 is shown as including forks 420 for reference. However, other load handling devices may be provided in addition to, or in place of the forks 420. The vehicle 400 may be understood to include similar functionality and components as vehicle 5 of FIG. 1, except that the vehicle 400 comprises a rotatable operator seat 450. In FIG. 7A, the rotatable operator seat 450 is shown in a forward facing position, such that an operator sitting in the operator seat 450 would normally be facing the forks 420.

Figure 7B:
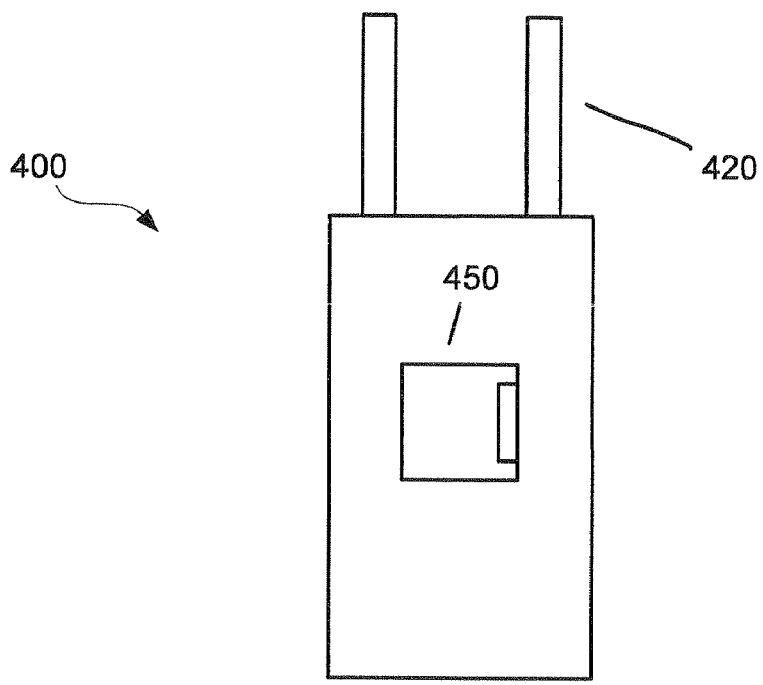
FIG. 7B illustrates a further example operator position in the vehicle of FIG. 14A.

FIG. 7B illustrates a further example operator position in the vehicle 400 of FIG. 7A. In this example, the operator seat 450 is rotated approximately ninety degrees from the operator position illustrated in FIG. 7A.

Figure 7C:
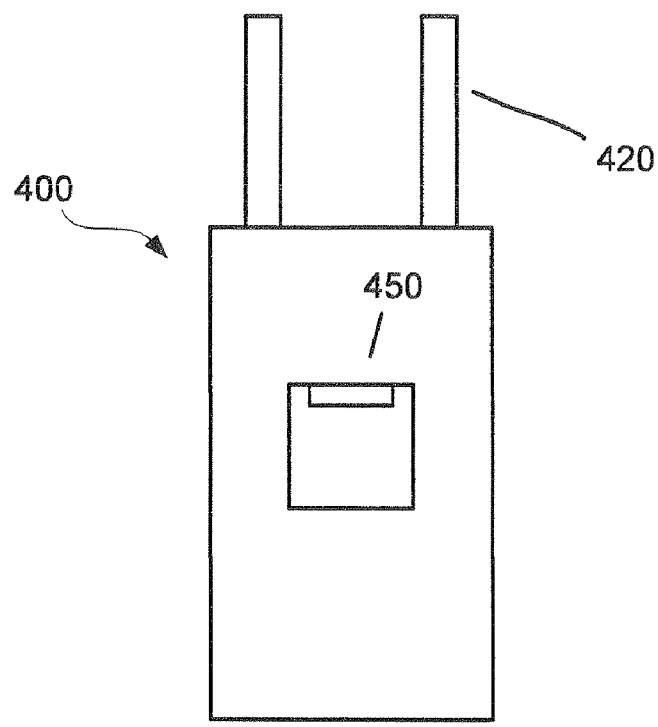
FIG. 7C illustrates yet another example operator position in the vehicle of FIG. 7A.

FIG. 7C illustrates yet another example operator position in the vehicle 400 of FIG. 7A. In this example, the operator seat 450 is rotated approximately 180 degrees from the operator position illustrated in FIG. 7A. The operator position associated with the operator seat 450 in FIG. 7C may be considered to be approximately opposite to that of the operator position illustrated in FIG. 7A.

One or more sensors (such as sensors P1, P2 of FIG. 8) may be provided to identify the rotational position of the operator seat 450. Operational parameters of the vehicle 400 may be controlled, selected, varied, changed, or modified when the operator seat 450 is rotated to a different operator position, similar to the discussion of the operational parameters associated with selection of the first control 101 and the second control 102 of FIG. 11. For example, the rotational position of the operator seat 450 illustrated in FIG. 7A may be associated with the first operator position described above. The rotational position of the operator seat 450 illustrated in FIG. 7C may be associated with the second operator position described above. In one embodiment, the rotational position of the operator seat 450 illustrated in FIG. 7B is associated with the second operator position described above.

The entire operator compartment of the vehicle 400 may also be configured to rotate about the vehicle 400, such that reference number 450 may alternatively be understood to represent the operator compartment, rather than the operator seat as previously described. In this embodiment, the one or more sensors would determine a rotational position of the operator compartment 450 to identify the corresponding operator position.

Figure 8:
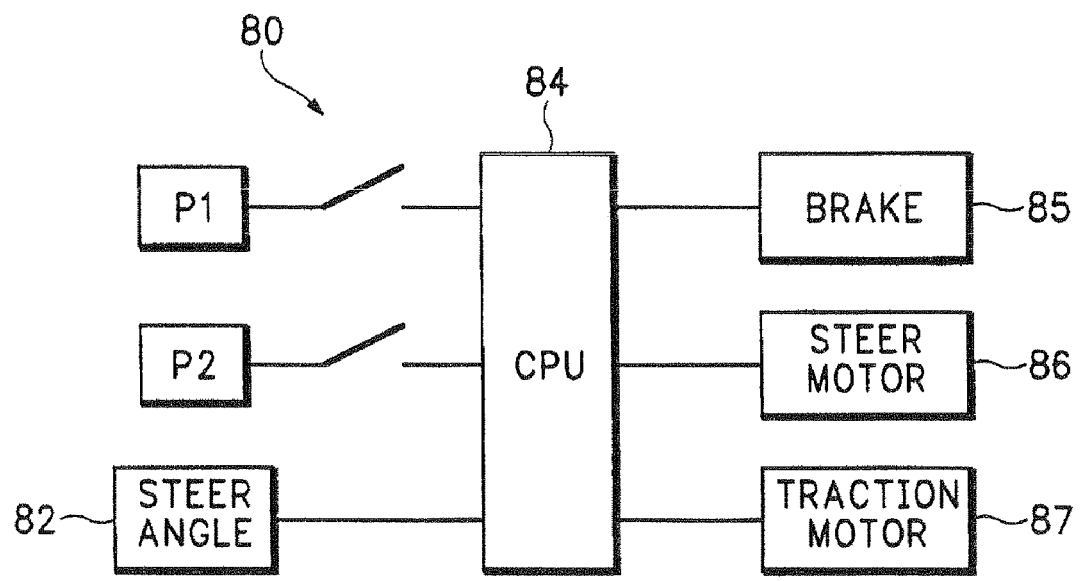
FIG. 8 is a simplified block diagram illustrating an example vehicle control system operable with a primary and secondary control.

FIG. 8 is a simplified block diagram illustrating an example vehicle control system operable with a steering system including a first and second control. A first operator presence sensor P1 may be associated with the first control and the second operator presence sensor P2 may be associated with the second control. A steer angle sensor 82 may be associated with a rotational angle of the steer tire(s) 90 of FIG. 1 and FIG. 4. Input from the operator presence sensors P1, P2 and the steer angle sensor 82 may be provided to an onboard vehicle processor 84. The processor 84 may process the input to control or modify operation of a vehicle brake 85, a vehicle steer motor 86, or a vehicle traction motor 87.

The operator presence sensors P1, P2 may be used to determine which of the first or second controls is being operated. The operator presence sensors P1, P2 may be used to determine a first and second position of the operator. The operator presence sensors P1, P2 may be included in control handles, control levers, control grips or direction controls in order to sense when an operator hand is in proximity. For example, a first position sensor P1 may be integrated into the primary hand grip 12 of FIG. 2 or the primary control 40 of FIG. 6 to determine when the operator is oriented in a first position, such as facing the forks 11 of the vehicle 5. A second position sensor P2 may be integrated into the secondary hand grip 14 of FIG. 2 or the secondary control 50 of FIG. 4 to determine when the operator is oriented in a second position, opposite the first position.

In one embodiment, the operator presence sensors P1, P2 may be used to activate or deactivate certain vehicle controls depending if the operator's hand is sensed or not, respectively. For example, when the second sensor P2 senses the operator's hand on the secondary control 50 of FIG. 4, functions associated with the primary control 40 may be deactivated. Similarly, when the second sensor P2 in the primary control 40 detects an operator's hand, functions associated with the secondary control 50 may be deactivated. In this manner, only one of two directional controls may be activated at any one give time, and inadvertent actuation of a control may be avoided. This sensor logic may be implemented for each of the above embodiments described with reference to FIGS. 2-7.

The sensors P1, P2 may be made to operate by sensing body heat, sensing pressure at multiple points on a control, or some other type of proximity sensing device. In one embodiment, detection of an operator's hand by both sensors P1, P2 would deactivate certain functions associated with both a first and second control. For example, an activation of both sensors P1, P2 may automatically deactivate the traction motor 87, and apply the vehicle brake 85.

In one embodiment, the second operator presence sensor P2 is associated with the second control, such as the secondary hand grip 14 or the secondary control 50. When the second operator presence sensor P2 detects the proximity of the operator, a steering sense of the steering apparatus 20 may be reversed. In this example, the processor 84 may control the steer motor 86 to steer the steer tires 90 in an opposite rotational sense than if the processor 84 received input from the first operator presence sensor P1.

FIG. 9 illustrates an example of steering a vehicle 5 in a forward and reverse direction. The steering apparatus 20 is shown with respect to operation of the vehicle 5 according to the first and second operator positions corresponding to first and second presence sensors P1, P2. The vehicle 10 is shown in phantom lines in order to more clearly illustrate the relationship between control of the steering apparatus 20 and the operation of the steered tires 90. The steered tires 90 are shown as being rotated in a clockwise (CW) direction with respect to vertical axes of rotation 95. When the vehicle 5 shown in FIG. 9 travels in a fork-first direction A, it turns in a counterclockwise (CCW) manner. However, when the vehicle 5 shown in FIG. 9 travels in a direction B opposite the forks, rotating the steered tires 90 in the clockwise direction causes the vehicle 5 to turn in a clockwise manner. One skilled in the art would appreciate that the steering apparatus 20 rotates about an axis of rotation similar to axis of rotation R-R illustrated with steering apparatus 70 of FIG. 7.

In a first case of FIG. 9, the steering apparatus 20 operates according to a first operator position associated with the first operator presence sensor P1 and the vehicle is traveling in a forward direction indicated as direction A. Rotating the steering apparatus 20 in the counterclockwise direction causes the steered tires 90 to rotate in the clockwise direction. While moving in the forward direction A, the counterclockwise rotation of the steering apparatus 20 results in a counterclockwise turn (to the left, with the operator facing towards direction A) of the vehicle 5.

In a second case of FIG. 9, the steering apparatus 20 operates according to a second operator position associated with the second operator presence sensor P2 and the vehicle 5 is traveling in a rearward direction indicated as direction B. Rotating the steering apparatus 20 in the clockwise direction causes the steered tires 90 to rotate in the clockwise direction. While moving in the rearward direction B, the clockwise rotation of the steering apparatus 20 results in a clockwise turn (to the right, with the operator facing towards direction B) of the vehicle 5.

Any reference to forks in this specification may be understood to similarly include other load handling mechanisms known in the art. A reference to a fork-first direction may be understood to also disclose vehicle travel in the direction of the load handling mechanism.

FIG. 10 illustrates a further example of steering a vehicle 5 in a forward and reverse direction. The steered tires 90 are shown as being turned in a counterclockwise direction with respect to vertical axes of rotation 95. When the vehicle 5 shown in FIG. 10 travels in fork-first direction A, it turns in a clockwise manner. However, when the vehicle 5 shown in FIG. 10 travels in a direction B opposite the forks, rotating the steered tires 90 in the counterclockwise direction causes the vehicle 5 to turn in a counterclockwise manner.

In a first case of FIG. 10, the steering apparatus 20 operates according to a first operator position associated with the first operator presence sensor P1 and the vehicle 5 is traveling in a forward direction indicated as direction A. Rotating the steering apparatus 20 in the clockwise direction causes the steered tires 90 to rotate in the counterclockwise direction. While moving in the forward direction A, the clockwise rotation of the steering apparatus 20 results in a clockwise turn (to the right, with the operator facing towards direction A) of the vehicle 5.

In a second case of FIG. 10, the steering control wheel 20 operates according to a second operator position associated with the second operator presence sensor P2 and the vehicle is traveling in a rearward direction indicated as direction B. Rotating the steering apparatus 20 in the counterclockwise direction causes the steered tires 90 to rotate in the counterclockwise direction. While moving in the rearward direction B, the counterclockwise rotation of the steering apparatus 20 results in a counterclockwise turn (to the left, with the operator facing towards direction B) of the vehicle 5.

By configuring the steering apparatus 20 to have an opposite rotational steering sense associated with the first operator presence sensor P1 as compared with the second operator presence sensor P2, the steering apparatus 20 performs similarly to an automotive steering system regardless of the operator orientation.

Whereas FIGS. 9 and 10 illustrate a system including two operator presence sensors P1 and P2, in an alternate embodiment an operator presence detection system may include a single operator presence sensor, such as sensor P1 or P2. When the sensor P1, P2 is not activated, the operator presence detection system may indicate that the steer motor 86 of FIG. 8 or the steering apparatus 20 should operate in a standard or normal steering sense. A standard steering sense may be associated with an operator position oriented towards the front 7 of the vehicle 5 shown in FIG. 1. In one embodiment, the standard steering sense is indicated by P1 in FIGS. 9 and 10.

When the sensor P1, P2 is activated, the steer motor 86 or steering apparatus 20 may be instructed to operate in an opposite or reverse steering sense compared to the standard steering sense. A reverse steering sense may be associated with an operator position oriented towards the ingress 4 of the vehicle 5 shown in FIG. 1. In one embodiment, the reverse steering sense is indicated by P2 in FIGS. 9 and 10. A processor, such as processor 84 of FIG. 8, may receive input from sensor P1, P2 prior to instructing the steer motor 86 or steering apparatus 20 and determining the corresponding steering sense.

Whereas the operator compartment 2 is shown and described having various components located at or near a right side 6, a front 7, a left side 8 or an ingress 4, one skilled in the art would understand that the components and controls could be provided at alternate locations not specifically illustrated in the embodiments. For example, the steering apparatus 20 of FIG. 1 or FIG. 4 could be located at or near the right side 6 and one or more of the controls 10, 40, 50 or 60 could be located at or near the left side 4. Furthermore, the terms left and right, front and rear, and forward and reverse/backward, may be similarly interchanged depending on the particular orientation or application of a motorized or industrial vehicle, and are used herein for illustrative purposes only.

A system that incorporates one or more of the sensors P1, P2 (FIG. 8) may provide a multi-control selection methodology which properly identifies, in a system comprising dual traction controls, which control is enabled at any given time. The multi-control selection may be used to provide continuous automotive steer sense, including a method of reversing the steering sense during operation, to make steering more intuitive to operators.

The multi-control selection, including sensors & activation sequences, are superior to complex algorithms based solely on signals (which must decipher & infer operator intention) to determine operator presence. Multi-control selection provides a method of controlling vehicle performance based on the enabled, or selected, control. In one embodiment, the steer control logic can be reversed based on the enabled control, or handle. In other embodiments, the multi-control selection provides for control of one or more vehicle performance characteristics such as steer resistance, steer rotation, maximum vehicle speed, vehicle acceleration, hydraulic function and performance, and braking performance.

In a system utilizing multiple control devices, the multi-control selection methodology may be used to determine which control is enabled for use at any given time. The one or more sensors P1, P2 may be installed locally in a control, such as in one or more of control handles 12, 14 (FIGS. 2-3) and controls 40, 50, 60 (FIGS. 4-6). In one embodiment, sensor P1 is installed in or otherwise associated with control handle 12, whereas sensor P2 is installed in or otherwise associated with control handle 14. In another embodiment, sensor P1 is installed in or otherwise associated with control 40, whereas sensor P2 is installed in or otherwise associated with either control 50 or control 60.

When only a single operator presence sensor is provided for, the single operator presence sensor (e.g. sensor P1 or sensor P2) may be installed in or otherwise associated with a secondary control, such as control handle 14, control 50, or control 60, whereas no operator presence sensor may be installed in or otherwise associated with a primary control, such as control handle 12 or control 40. When the single operator presence sensor does not detect an operator presence, the primary control may automatically be assumed to be the operable, or enabled, control whereas the secondary control is assumed to be disabled.

The one or more sensors P1, P2 may comprise proximity switches, optical sensors, capacitive sensors, or any type of conventional sensor. The one or more sensors P1, P2, when combined with sensing logic, or an activation sequence, may be used to determine which one of the multiple controls is enabled to operate the vehicle 5.

Figure 11:
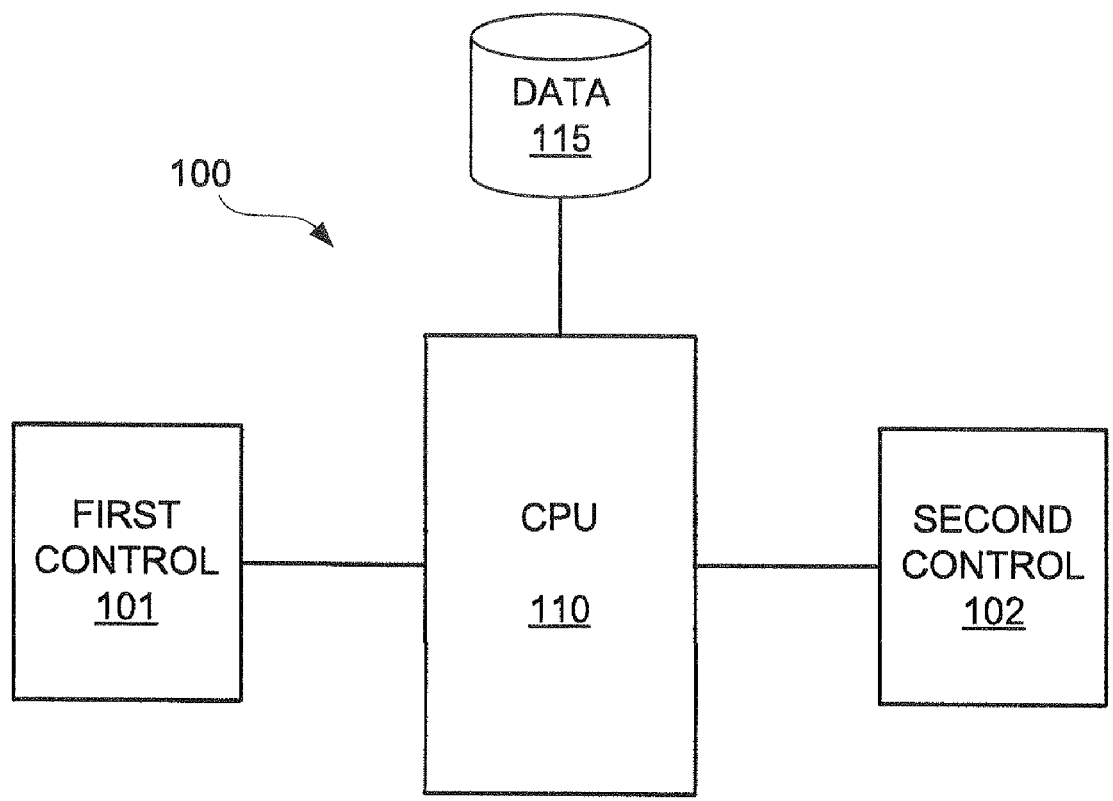
FIG. 11 is a simplified block diagram illustrating an example vehicle control system comprising a first control and second control.

FIG. 11 is a simplified block diagram illustrating an example vehicle control system 100 comprising a first control 101 and second control 102. First control 101 and second control 102 are shown as being connected to or in communication with a processor 110. Processor 110 may operate similarly, or otherwise be the same as, processor 84, such that processor 110 may be understood to communicate with, receive input from, send input to, or control any of the one or more sensors P1, P2, steer angle sensor 82, vehicle brake 85, vehicle steer motor 86, and vehicle traction motor 87 illustrated in FIG. 8. Processor 110 is further shown communicatively coupled to, or comprising, a memory 115.

In some embodiments, first control 101 may be considered a primary control, and second control 102 may be considered a secondary or auxiliary control. For example, control handle 12 (FIGS. 2-3) or control 40 (FIGS. 4-6) may be operable as the first control 101, and control handle 14 (FIGS. 2-3), control 50 (FIGS. 4-5), or control 60 (FIG. 6) may be operable as the second control 102. In other embodiments, first or second controls 101, 102 may comprise levers, buttons, toggles, pedals, dead man switches or other types of conventional control devices. These other types of control devices may be configured with one or more sensors.

Figure 12:
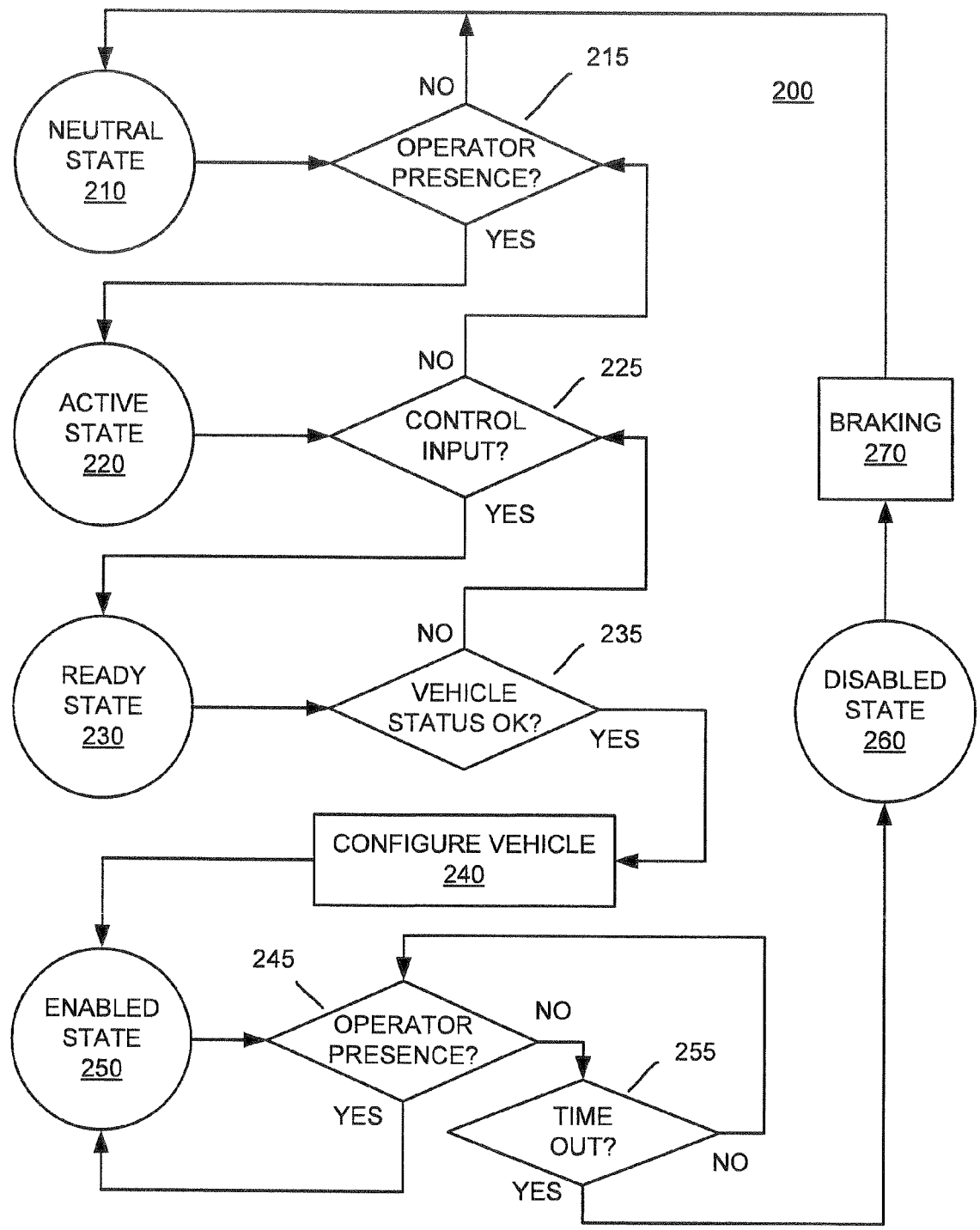
FIG. 12 is an example flow chart illustrating sensing logic for multi-directional vehicle control.

FIG. 12 is an example flow chart illustrating sensing logic 200, including a multi-control selection methodology, algorithm, or activation sequence, for multi-directional vehicle control. Example operating states for the first and second controls 101, 102 (FIG. 11), as described with reference to the sensing logic flow chart 200, include an active state, ready state, enabled state, disabled state, and a neutral state. A control which the operator has selected (e.g. by placing the operator's hand or foot on the control) may be referred to as the selected control. When the first control 101 is identified as being the selected control, the second control 102 is a non-selected control. When the second control 102 is identified as being the selected control, the first control 101 is a non-selected control.

ACTIVE STATE. In a dual sensor operator presence system, input from one or more of the sensors, such as sensors P1, P2 (FIG. 8) indicates an operator presence at one of the controls 101, 102. The control where operator presence is detected or otherwise indicated, is determined to be in the active state. In a single sensor operator presence system, input received from the sensor may similarly indicate an operator presence at one of the controls. For example, the control 101 or 102 where operator presence is detected, may be identified as being in the active state. In some embodiments, a primary control may be identified as being in the active state even when no operator presence is detected at either the first control 101 or the second control 102. The primary control may be considered to be in the active state as a system default. The control which is identified as being in the active state, may be referred to as being the active control for convenience.

READY STATE. The processor 110 (FIG. 11) may be configured to receive input from the first and second controls 101, 102. For example, first and second controls 101, 102 may send one or more inputs comprising steering, throttle, vehicle direction, braking, lift, lower, tilt, side-shift, skew, rotate, clamp, lock, unlock, etc. The processor 110 may determine if the active control is sending any input to the processor 110 or sending any operating commands to any of the vehicle brake 85, vehicle steer motor 86, vehicle traction motor 87 or other vehicle component. In some embodiments, the processor 110 identifies the active control as being in the ready state when the active control is not sending any operating commands. For example, the processor 110 may determine that the active control is in the ready state when the throttle request is zero, or when the vehicle traction system is in neutral. An active control which is determined to be in the ready state may be referred to as being the ready control for convenience.

ENABLED STATE. The processor 110 (FIG. 11) may further be configured to receive input from the vehicle brake 85, vehicle steer motor 86, vehicle traction motor 87, traction system, hoist motor, hydraulic system, electrical system or other vehicle component or sensor associated therewith, to determine an operating condition of the vehicle. For example, the processor 110 may identify a vehicle travel speed, a steering angle, or a hydraulic pressure to determine if the vehicle is moving or what, if any, vehicle functions are being operated. A lack of input from any one of the vehicle components may also be interpreted by the processor 110 as indicating a particular operating condition of one or more of the vehicle components, systems, or of the vehicle in general.

In some embodiments, the processor 110 identifies the ready control as being in the enabled state when the received input (or lack thereof) indicates the vehicle is in a relatively inactive state. For example, the processor 110 may determine that the ready control is in the ready state provided the vehicle travel speed is below a certain threshold value, or at or near zero km/hr (mph). The processor 110 commands the vehicle brakes 85 to engage prior to entering the enabled state. In some embodiments, the processor 110 first determines if the vehicle brake 85 has been engaged before the control enters the enabled state. The processor 110 may actively command certain vehicle operations to operate in a standby or reset mode corresponding to the enablement of the ready control. For example, the processor 110 may command the steer tires 90 (FIG. 1) to position to a default steering angle such as a zero degree turn prior to, or at the time of, the selected control being enabled. The enabled control may provide control over one or more vehicle operations or components, such as the traction motor 87.

DISABLED STATE. A control which has not entered, has not been identified as being in, or does not satisfy the conditions of, the enabled state, may instead be identified by the processor 110 as being in a disabled state. The disabled control may simultaneously be an active control or a ready control, or a control which has not been identified as being in either of the active state or the ready state. In some embodiments, the disabled control is incapable of commanding certain vehicle operations. For example, the disabled control may not be able to request vehicle acceleration associated with the traction motor 87. In some embodiments, the disabled control may be incapable of commanding any vehicle operation. When the selected control is enabled, the non-selected control may become disabled. Similarly, when the selected control becomes active or ready, the non-selected control may become disabled.

NEUTRAL STATE. When operator presence is not detected by any of the one or more sensors P1, P2, one or both controls 101, 102 may be identified by the processor 110 as being in a neutral state. In some embodiments, the non-selected control will remain in, or transition to, the neutral state unless the selected control becomes active, ready or enabled. One or both controls 101, 102 may transition out of the neutral state if a throttle command is received, or if a vehicle travel speed is greater than zero. A control may simultaneously exist in both the neutral state and the disabled state. In some embodiments, a control that is in the neutral state maintains complete functionality, except that traction control is disabled.

One or more of the states may be cumulative. A control that is in the ready state may also be considered to be in the active state. That is, the control may be in both the ready state and the active state simultaneously. A control that is in the enabled state may also be considered to be in the ready state. That is, the control may be in both the enabled state and the ready state simultaneously. Furthermore, a control may be in all three of the active, ready, and enabled states at the same time. The control may remain in the active and ready states as it transitions into the enabled state.

The sensing logic 200 of FIG. 12 may be understood to illustrate the following example of a multi-control selection methodology for enabling a selected control which incorporates, or is associated with, an operator presence sensor, such as sensor P1 or sensor P2. In a single sensor operator presence system, the selected control may not be associated with any sensor. The primary control may be considered active (by default) any time that the sensor associated with the secondary control does not detect an operator presence. Other states may be understood to operate, or be identified, similarly as between the single sensor and dual sensor operator presence systems.

At vehicle start-up, one or both of the controls 101, 102 (FIG. 11) are identified as being in a neutral state 210. In some embodiments, both controls 101, 102 begin in the neutral state 210. The sensing logic 200 may remain in the neutral state 210 for some minimum predetermined period of time during vehicle start up or vehicle diagnostics, before transitioning to operation 215.

At operation 215, the sensing logic 200 determines if the conditions for operator presence have been met. These conditions may comprise input from a sensor to indicate that a user has selected the control (e.g. either the first control 101 or the second control 102). The conditions may further comprise non-receipt of any input from the non-selected control. For example, if operator presence is detected on the second control 102 while a throttle input was being received from the first control 101, the sensing logic 200 may determine that the conditions for operator presence at operation 215 have not been met. Where the conditions for operator presence have not been met, the sensing logic 200 returns to the neutral state 210. The sensing logic 200 may remain in the neutral state 210 until the conditions for operator presence have been met.

Once the conditions for operator presence have been met at operation 215, the sensing logic 200 transitions to the active state 220, and the selected control becomes the active control. In some embodiments, the non-selected control remains in the neutral state 210.

At operation 225, the sensing logic 200 determines if the active control is providing input. The input may comprise a request for vehicle acceleration, for example. Where no input is detected, the sensing logic 200 returns to operation 215 to determine if the conditions for operator presence are still being met. The sensing logic 200 may remain in the active state 220 until the control input is detected.

Once the control input is detected at operation 225, the sensing logic 200 transitions to the ready state 230, and the active control becomes the ready control. In some embodiments, the non-selected control remains in the neutral state 210.

At operation 235, the sensing logic 200 determines if the conditions for vehicle operation have been met. These conditions may comprise a vehicle status check from one or more vehicle sensors to determine if the vehicle is in a relatively static condition. For example, the conditions may comprise an indication that the vehicle is stopped, that a traction system or throttle is in neutral, or that the vehicle travel speed is less than some predetermined value (e.g. 0.1 km/hr). If vehicle travel speed is greater than zero or some predetermined value, the sensing logic 200 may determine that the conditions for vehicle operation at operation 235 have not been met. Other conditions for vehicle operation may be that only one control is active, or that only one control is ready. In some embodiments, the sensing logic 200 will not transition to the enabled state 240 if any input is being provided by the non-selected control.

The conditions for vehicle operation may comprise the activation of an enablement mechanism. For example, a switch or button may be provided on one or both of the controls 101, 102 that further indicates, reinforces or validates the selection of the control. Depression of a button, such as button 16 or 18 (FIG. 2), button 58 (FIG. 5) or button 68A, B (FIG. 6) may indicate an operator's intent to command the corresponding control to operate the vehicle. The button may make an audible or visible alert to indicate that the control has been selected. The enablement mechanism (e.g. switch or button) may also provide the functionality to indicate the operator presence at operation 215.

When the conditions for vehicle operation have not been met, the sensing logic 200 returns to operation 225 to identify the control input. In some embodiments, one or both of the controls 101, 102 are able to request vehicle braking or regenerative plugging in any of the neutral state 210, the active state 220, or the ready state 230. The sensing logic 200 may remain in the ready state 230 until the conditions for vehicle operation have been met. For example, the sensing logic 200 may remain in the ready state 230 until the vehicle comes to a stop.

Once the conditions for vehicle operation have been met at operation 235, the sensing logic 200 transitions to operation 240. Vehicle operating parameters may be verified, selected, configured, or reconfigured at operation 240 according to which control is selected in the ready state 230. The vehicle operating parameters may further be verified, selected, configured, or reconfigured according to which direction of travel the vehicle was, or is, moving in. If a steering sense of the vehicle is reversed, the steering tires 90 (FIG. 1) may be made to return to an approximately zero degree turn (i.e. straight ahead direction) to reset the steering angle of the vehicle at operation 240. The steering tires 90 may be returned to zero degree turn when they are found to be outside some threshold turning range. Returning the steering tires 90 to the zero degree turn assists the operator in anticipating a next direction of vehicle travel upon throttle up. In some embodiments, operation 240 is optional, wherein the sensing logic will instead directly transition to the enabled state 250 from operation 235. A more detailed description of operation 240 follows the present discussion of the example flow chart of sensing logic 200.

Once the vehicle operating conditions have been verified, selected, configured, or reconfigured at operation 240, the sensing logic 200 transitions to the enabled state 250, and the ready control becomes the enabled control. In some embodiments, once the selected control becomes the enabled control, any subsequent input from the non-selected control is ignored. The non-selected control may be ignored until or unless the operator presence is no longer detected for the selected control.

In the enabled state 250, full functionality of the selected or enabled control may be restored or provided for. For example, the enabled control may be able to command acceleration from the traction motor 87 of FIG. 8.

At operation 245, the sensing logic 200 determines if the conditions for operator presence continue to be met. These conditions may comprise input from a sensor to indicate that user continues to hold, press, touch or otherwise come into contact with, or control, the enabled control. The conditions may further comprise non-receipt of any input from the non-selected control. If the conditions for operator presence have been met at operation 245, the sensing logic 200 remains in the enabled state 250.

When the conditions for operator presence have not been met at operation 245, the sensing logic 200 transitions to operation 255. At operation 255, the sensing logic 200 determines if the enabled control has provided input over some predetermined period of time. The input may comprise a request for throttle, for example. The predetermined period of time may provide the operator time to remove his hand momentarily from the enabled control, and then regain control of the vehicle without the control becoming disabled. Where no input, or no operator presence, is detected for the predetermined period of time, the sensing logic 200 determines that the enabled control has timed out and transitions to the disabled state 260.

If input is provided within the predetermined period of time, the sensing logic 200 transitions back to operation 245 to determine if the operator presence has been restored. If the operator presence has been restored at operation 245, the sensing logic remains in the enabled state 250 and full functionality of the enabled control is maintained. If the operator presence has not been restored at operation 245, the sensing logic 200 ignores the input and continues to monitor for a valid input at operation 255 without resetting the predetermined period of time for timing out the enabled control. When the predetermined time has expired, the sensing logic 200 transitions to the disabled state 260.

In some embodiments, the sensing logic 200 may automatically transition to the disabled state any time that the conditions for operator presence have not been met at operation 245. For example, the predetermined period of time may be set to zero seconds, or operation 255 may be removed from the sensing logic 200 altogether, with operation 245 instead transitioning directly to the disabled state 260. In some embodiments, the sensing logic 200 transitions to the disabled state anytime that input is received from the second control 102 while the first control 101 is enabled. The vehicle may make an audible alert or visual indication when the sensing logic 200 transitions to, or from, the enabled state 250.

In the disabled state 260, selective functionality of the one or more controls 101, 102 may be disabled. In some embodiments, one or both of the controls 101, 102 may command vehicle braking or horn activation in the disabled state 260. The sensing logic 200 may begin automatic vehicle braking at operation 270 when it detects vehicle movement without any control being enabled. The vehicle may be commanded to a controlled stop without any operator intervention. The controlled stop may comprise a soft plug reversal operation. When the vehicle has come to a complete stop, the sensing logic may return to the neutral state 210.

Default settings may be provided for each of the vehicle operating parameters. For example, there may be a default steer sense associated with a primary position or primary direction of travel. Similarly, there may be default auto centering (return to center) of the steered wheels, default speed settings, default braking effort, etc. After the sensing logic 200 enters the disabled state, the vehicle operating system may be restored to the original, or default, vehicle operating parameters.

The first and second controls 101, 102 may be associated with different primary or preferred directions of vehicle travel. First control 101 may be associated with a first primary direction of travel, for example, where an operator is positioned to face the forks (or front) of the vehicle, and wherein the first primary direction of travel is in the direction the operator is facing. The second control 102 may be associated with a second primary direction of vehicle travel opposite the first direction of travel. For example, the second control 102 may be associated with an operator that is positioned to face in a direction that is opposite the forks, or to the rear of the vehicle (see vehicle 5 of FIGS. 1, 4, 9, and 10 by way of illustration), and wherein the second primary direction of travel is in the direction the operator is facing.

The vehicle may be made to travel in both the first direction and the second direction, according to throttle commands from the first and second controls 101, 102. The first control 101 may command the vehicle to move forward in the first direction, or backward in the second direction. The second control 102 may command the vehicle to move forward in the second direction, or backward in first direction. Accordingly, what is considered the forward or backward direction of vehicle travel may depend, or change, according to which control is being operated or enabled. For example, a forward direction of travel associated with the first control 101 may be associated with a forks-first direction of travel. Whereas a forward direction of travel associated with the second control 102 may be associated with a direction of travel opposite that of the forks. A direction of vehicle travel that is opposite to the direction the operator is facing may be considered an ancillary direction of travel. The ancillary direction of travel may depend, or change, according to which control is being operated or enabled, similar to the above discussion regarding the primary direction of travel.

One or more sets of vehicle operating parameters may be associated with the forward direction of travel of the vehicle at operation 240. In some embodiments, the vehicle operating parameters associated with the forward direction of vehicle travel is the same for the first control 101 and the second control 102, except that the definition of which vehicle operating direction is forward is opposite for the two controls. A different set of vehicle operating parameters may be associated with the backward direction of vehicle travel. In some embodiments, the vehicle operating parameters associated with the backward direction of vehicle travel is the same for the first control 101 and the second control 102, except that the definition of which vehicle operating direction is backward is opposite for the two controls.

The maximum vehicle travel speed, the rate of acceleration, the rate of steering angle change, the maximum steering angle, or other vehicle operating parameters associated with the forward direction of vehicle travel may be greater than the corresponding operating parameters associated with the backward direction of vehicle travel. The vehicle operating parameters may be stored in, generated by, or otherwise determined from the processor 110 and memory 115 of FIG. 11.

The sensing logic 200 may be configured to select, modify or reverse certain of the vehicle operating parameters according to which control is enabled, and according to which vehicle direction orientation (e.g. forks-first) is, or was last, selected. When automatic steer reversal is selected, the sensing logic 200 may reverse or switch the steer control input to maintain continuous automotive steering sense for both the first and second controls 101, 102. When automatic traction limitation is selected, the sensing logic 200 may reverse or switch the directional speed limitation, wherein the forward maximum speed is different than the backward maximum speed. For example, the maximum forward travel speed associated with the forks-first vehicle travel direction may be replaced or switched with the maximum backward travel speed, wherein forward and backward vehicle directions depend on which of the first and second controls 101, 102 are selected or enabled.

In a single sensor operator presence system, wherein the sensor is associated with the second control 102, the first control 101 may be identified as being in the active state 220 anytime that the second control 103 is in the neutral state 210. In some embodiments, the first control 101 is identified as being in the active state 220 anytime the second control 102 is identified as being in the disabled state 260. The steering sense may remain in a default setting associated with the first control 101 unless the second control 102 is enabled.

In some embodiments, only one of the controls 101, 102 may be enabled at any one time. For example, if an activation sequence (e.g. FIG. 12) of the selected control is not followed, then the control may not be enabled, even where an operator presence is detected. This avoids having a system that must deduce which control should be enabled based on anticipating the operator intent. When operator presence is not confirmed, or when multiple sensory inputs are received, one or both controls 101, 102 may be disabled. The operator may be notified of one or more of the control states 210-260 visually as well as audibly.

As previously discussed, automotive steer sense refers to automobile-like steering control. For example, when the operator rotates the steering device (e.g. steering wheel) right, the vehicle turns right. When the steering device is rotated left, the vehicle turns left. What is considered right and left depends on the orientation of the operator. When the operator is facing toward the forks (or front of the vehicle) this is the primary position. When the operator is facing opposite the forks (or toward the rear of the vehicle) this is the secondary position.

In conventional vehicles, when the operator turns around from the primary to the secondary position, the steering operation doesn't change. Steer sense becomes the opposite of automotive steering in the secondary position. This makes driving the vehicle less intuitive and lengthens the learning curve for operator training.

Providing dual controls with operator presence allows the system to automatically reverse the steer input command, creating continuous automotive steering regardless of which control is selected or enabled. A more natural, automotive steering sense is provided in both the primary and secondary positions.

When reversing the steer sense, the steer system may return the steered wheels 90 (FIG. 1) to a 0° or straight ahead angle to keep the operator from making large steer direction errors that might otherwise occur if the orientation of the steered wheels 90 is not known. As previously discussed, traction speed limitations can also reverse based on the selection of enablement of the first control 101 or the second control 102. In some embodiments, the steer ratio, the resistance of the steer device, the maximum travel speed, the maximum acceleration, and braking performance may vary according to which control is selected or enabled.

In some embodiments, a conflict may be detected when it is unclear which of the first or second controls 101, 102 have been selected or enabled or, for example, when both controls have been selected. A conflict may be detected if the operator selects a control while the vehicle is moving. If a conflict is detected, the vehicle may undergo automatic braking (for example regenerative braking). If a conflict is detected, the default or original steering sense that was selected or enabled prior to the conflict being detected may be restored.

Figure 13:
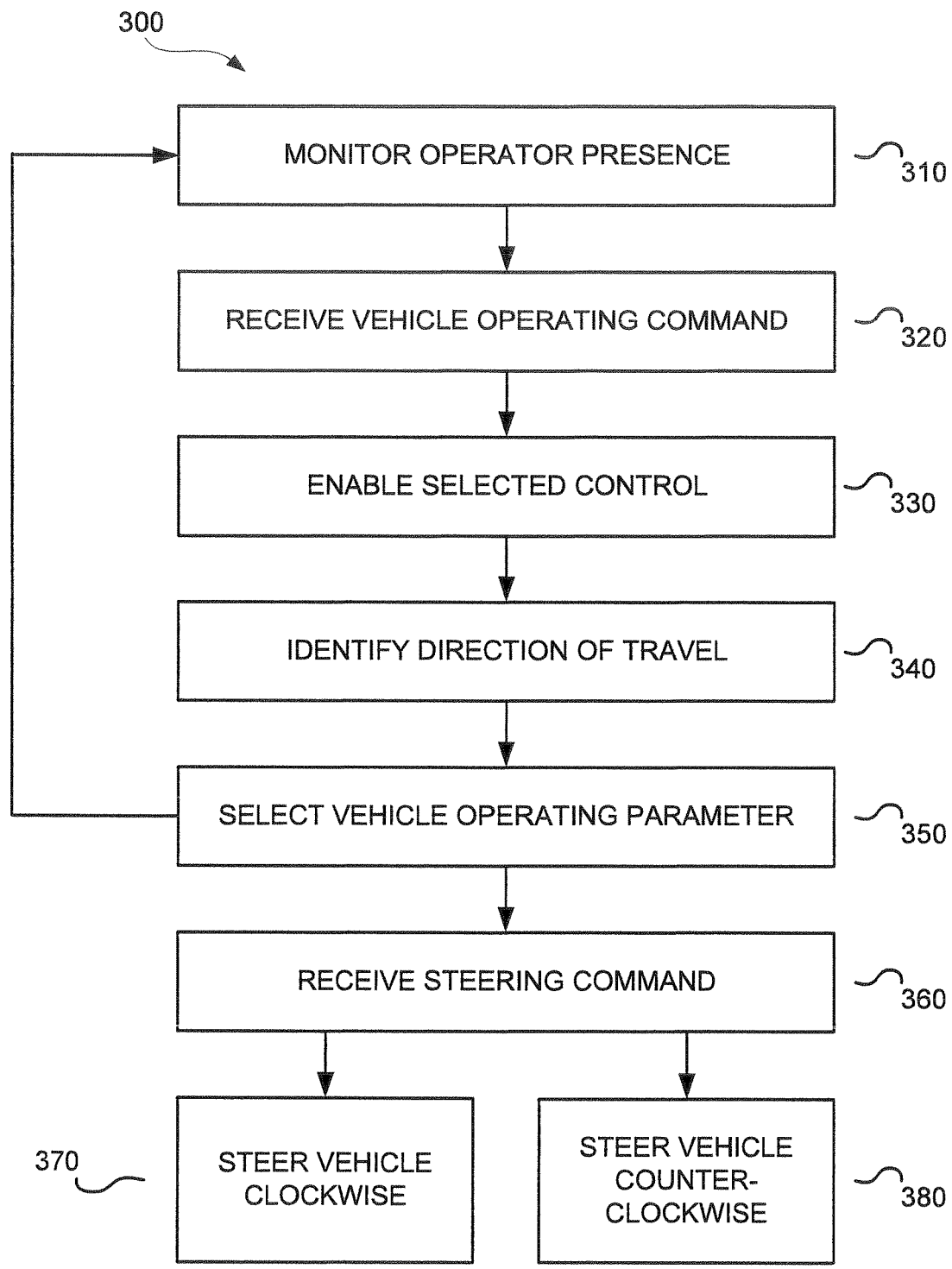
FIG. 13 illustrates an example method of multi-direction vehicle control sensing.

FIG. 13 illustrates an example method 300 of multi-direction vehicle control sensing. At operation 310, an operator presence is monitored at a first control of a vehicle. The vehicle may include two or more control handles. The first control handle may be the selected control.

At operation 320, a vehicle operating command is received from a control selected from the group consisting of the first control and a second control of the vehicle. The first control may be associated with a first operator position, and the second control may be associated with a second operator position oriented opposite the first operator position. The first and second controls may comprise separate or integrated control handles.

The vehicle operating command may comprise a request for a maximum vehicle travel speed in a selected direction of travel. The maximum travel speed associated with the first control may be greater than, or different from, the maximum travel speed associated with the second control. The vehicle operating parameter may also comprise a maximum steer angle of the vehicle, wherein the maximum steer angle associated with the first control is greater than, or different from, the maximum steer angle associated with the second control. In some embodiments, the vehicle command is compared with a state of vehicle operation to determine if a vehicle is in a ready state. Other vehicle operating parameters include: vehicle acceleration, braking force, steering apparatus rotational resistance to motion, and steer ratio, by way of example.

At operation 330, the selected control is enabled to command the vehicle. The non-selected control may be disabled, or remain in a disabled state, such that only one control is enabled at any one time. For example, the non-selected control may not be enabled to command vehicle acceleration. In some embodiments, the non-selected (disabled) control is configured to command a braking system to brake the vehicle when the selected control is enabled.

At operation 340, a direction of vehicle travel is selected or identified. The direction of vehicle travel may comprise a current direction of vehicle travel, or the last direction of vehicle travel. For example, the direction of travel may be in the fork-first direction.

At operation 350, a vehicle operating parameter is selected for the vehicle operating command, wherein the vehicle operating parameter associated with the operating command varies depending on which control is enabled. The vehicle operating parameter may further vary depending on the selected direction of vehicle travel. For example, a rate of vehicle acceleration, a rate of vehicle braking, or a maximum allowable steering angle may be different when the primary direction of travel is selected as compared to when the ancillary direction of travel is selected. The vehicle command may be implemented when the vehicle is in the ready state. A continued operator presence may be monitored at the enabled control. The enabled control may be disabled when the continued operator presence is not detected for a predetermined time period.

In some embodiments, the vehicle operating parameter comprises a vehicle steer sense, wherein an orientation of the vehicle steer sense reverses depending on which control is enabled. The following operations correspond to these embodiments.

At operation 360, a steering command is received. For example, the steering command may comprise a clockwise rotation of a steering apparatus, or steering wheel. The steering command may be received from the steering apparatus, wherein the steering apparatus is located on an opposite side of the vehicle from the first and second control handles. In some embodiments, the steer sense orientation associated with a same direction of vehicle travel may be reversed according to which control is enabled.

At operation 370, the vehicle is steered in a clockwise sense in the direction of travel in response to the steering command when the first control is enabled. For example, the vehicle is steered in a clockwise sense when the direction of travel is forks-first and the steering apparatus is turned clockwise. When the first control handle is enabled, the second control may be disabled, at least for certain functions.

At operation 380, the vehicle is steered in a counterclockwise sense in the forks-first direction of travel in response to the steering command when the second control is enabled. In both operations 370 and 380, the steering command received from the steering apparatus may be the same, however the vehicle turns in an opposite steer sense for the same direction of vehicle travel. Accordingly, the vehicle is steered in a counterclockwise sense when the direction of travel is forks-first and the steering apparatus is turned clockwise with the second control being enabled. When the second control is enabled, the first control may be disabled, at least for certain functions. When both the first and second controls are disabled, the vehicle may be automatically braked to a controlled stop without any operator intervention.

The system and apparatus described above can use dedicated processor systems, micro controllers, programmable logic devices, or microprocessors that perform some or all of the operations. Some of the operations described above may be implemented in software and other operations may be implemented in hardware. The processor can execute instructions or "code" stored in memory. The memory may store data as well. A processor may include, but is not limited to, an analog processor, a digital processor, a microprocessor, multi-core processor, processor array, network processor, etc. The processor may be part of an on-board vehicle control system or system manager, or provided as a portable electronic device capable of interfacing with the vehicle control system either locally or remotely via wireless transmission.

The processor memory may be integrated together with the processor, for example RAM or FLASH memory disposed within an integrated circuit microprocessor or the like. In other examples, the memory comprises an independent device, such as an external disk drive, storage array, or portable FLASH key fob. The memory and processor may be operatively coupled together, or in communication with each other, for example by an I/O port, network connection, etc. such that the processor can read a file stored on the memory. Associated memory may be "read only" by design (ROM) by virtue of permission settings, or not. Other examples of memory include but are not limited to WORM, EPROM, EEPROM, FLASH, etc. which may be implemented in solid state semiconductor devices. Other memories may comprise moving parts, such a conventional rotating disk drive. All such memories are "machine readable" in that they are readable by a processor.

As explained above, the present invention may be implemented or embodied in computer software (also known as a "computer program" or "code"). Programs, or code may be stored in a digital memory that can be read by the processor. We use the term "computer-readable storage medium" (or alternatively, "machine-readable storage medium") to include all of the foregoing types of memory, as well as new technologies that may arise in the future, as long as they are capable of storing digital information in the nature of a computer program or other data, at least temporarily, in such a manner that the stored information can be "read" by an appropriate processor. By the term "computer-readable" we do not intend to limit the phrase to the historical usage of "computer" to imply a complete mainframe, mini-computer, desktop or even laptop computer. Rather, we use the term to mean that the storage medium is readable by a processor or any computing system. Such media may be any available media that is locally and/or remotely accessible by a computer or processor, and it includes both volatile and non-volatile media, removable and non-removable media.

Where a program has been stored in a computer-readable storage medium, we may refer to that storage medium as a computer program product. For example, a storage medium may be used as a convenient means to store or transport a computer program.

For the sake of convenience, the operations are described as various interconnected functional blocks or diagrams. This is not necessary, however, and there may be cases where these functional blocks or diagrams are equivalently aggregated into a single logic device, program or operation with unclear boundaries.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A method, comprising:
monitoring an operator presence at one or more control handles of a vehicle, wherein the vehicle comprises two or more control handles, and wherein at least one control handle is configured to detect the operator presence;
receiving a vehicle operating command from a control selected from the group consisting of the two or more control handles; and
enabling the selected control to command the vehicle.

2. The method according to claim 1, wherein a first control handle is associated with a first operator position, wherein a second control handle is associated with a second operator position, and wherein the second control handle comprises a sensor configured to detect the operator presence.

3. The method according to claim 2, wherein the second operator position is substantially opposite to that of the first operator position.

4. The method according to claim 2, wherein the vehicle operating command comprises a maximum vehicle travel speed in a primary direction of travel associated with the selected control, and wherein the maximum travel speed associated with the first control handle is different than the maximum travel speed associated with the second control handle.

5. The method according to claim 2, wherein the sensor is configured to detect the operator presence independently of the received vehicle operating command.

6. The method according to claim 1, wherein the vehicle operating command comprises a steering orientation of the vehicle, and wherein the steering orientation reverses depending on which control is enabled.

7. The method according to claim 6, further comprising:
receiving a clockwise steering command;
steering the vehicle in a clockwise sense in a first direction of travel in response to the clockwise steering command when the first control handle is enabled; and
steering the vehicle in a counterclockwise sense in the first direction of travel in response to the clockwise steering command when the second control handle is enabled.

8. The method according to claim 7, wherein the steering command is received from a steering apparatus, and wherein the steering apparatus is located on an opposite side of the vehicle from the selected control.

9. A vehicle, comprising:
two control devices configured to operate the vehicle, including a first control and a second control; and
a processing device configured to:
monitor an operator presence at one or both of the two control devices, wherein at least one control device is configured to detect the operator presence;
receive a vehicle operating command from a control selected from the two control devices; and
enable the selected control to command the vehicle.

10. A memory device having instructions stored thereon that, in response to execution by a processing device, cause the processing device to perform operations comprising:
monitoring an operator presence at one or more control handles of a vehicle, wherein the vehicle comprises two or more control handles, and wherein at least one control handle is configured to detect the operator presence;
receiving a vehicle operating command from a control selected from the group consisting of the two or more control handles; and
enabling the selected control to command the vehicle.

11. The memory device according to claim 10, wherein the instructions further comprise disabling the control which is not selected, wherein the disabled control is not enabled to request vehicle acceleration, and wherein the disabled control is configured to command a braking system to brake the vehicle when the selected control is enabled.

12. The memory device according to claim 10, wherein the instructions further comprise:
monitoring a continued operator presence at the enabled control; and
disabling the enabled control when the continued operator presence is not detected for a predetermined time period.

13. The memory device according to claim 10, wherein the instructions further comprise:
comparing the vehicle operating command with a state of vehicle operation to determine if a vehicle is in a ready state;
selecting a vehicle operating parameter associated with the vehicle operating command; and
implementing the vehicle command when the vehicle is in the ready state, wherein the vehicle operating parameter is modified according to which of the first control or the second control is enabled.

14. The memory device according to claim 13, wherein the vehicle operating parameter comprises a maximum steer angle of the vehicle, and wherein the maximum steer angle associated with the first control is different than the maximum steer angle associated with the second control.

15. An apparatus, comprising:
means for monitoring an operator presence at one or more control handles of a vehicle, wherein the vehicle comprises two or more control handles, and wherein at least one control handle is configured to detect the operator presence;
means for receiving a vehicle operating command from a control selected from the group consisting of the two or more control handles; and
means for enabling the selected control to command the vehicle.

16. The apparatus according to claim 15, wherein the two or more control handles comprise a first control and a second control, wherein the first control is configured to operate the vehicle from a first operator position facing a front of the vehicle, and wherein the second control is configured to operate the vehicle from a second operator position facing a rear of the vehicle.

17. The apparatus according to claim 15, wherein the two or more control handles comprise a first control and a second control, wherein the first control is approximately located in a front of the vehicle, and wherein the second control is approximately located in the rear of the vehicle.

18. The apparatus according to claim 15, further comprising means for selecting a vehicle operating parameter associated with a vehicle operating request, wherein the vehicle operating parameter varies according to which control is enabled.

19. The apparatus according to claim 18, wherein the two or more control handles comprise a first control and a second control, wherein the vehicle operating parameter comprises a maximum rate of acceleration of the vehicle, and wherein the maximum rate of acceleration associated with the first control is different than the maximum rate of acceleration associated with the second control.

20. The apparatus according to claim 18, further comprising means for braking, wherein the vehicle operating parameter comprises a maximum braking force, wherein the two or more control handles comprise a first control and a second control, and wherein the maximum braking force associated with the first control being enabled is different than the maximum braking force associated with the second control being enabled.

21. The apparatus according to claim 18, further comprising means for providing a steering command, wherein the two or more control handles comprise a first control and a second control, wherein the vehicle turns left in a first direction of travel in response to the steering command when the first control is enabled, and wherein the vehicle turns right in the first direction of travel in response to the same steering command when the second control is enabled.

22. The apparatus according to claim 18, further comprising one or more sensors configured to detect the operator presence, wherein the enabled control is the control associated with the operator position where the operator presence is detected.

* * * * *